United States Patent [19]

Nevins

[11] 4,197,834
[45] Apr. 15, 1980

[54] SOLAR ENERGY COLLECTOR AND ASSOCIATED METHODS ADAPTED FOR USE WITH OVERLAPPED ROOF SHINGLES ON THE ROOF OF A BUILDING

[76] Inventor: Robert L. Nevins, 12 Franklin Rd., Great Neck, N.Y. 11024

[21] Appl. No.: 896,470

[22] Filed: Apr. 14, 1978

[51] Int. Cl.² ............................ F24J 3/02; E04D 1/00; F28F 1/32
[52] U.S. Cl. .................................... 126/442; 52/518; 126/446; 126/448; 126/452; 165/171; 165/173
[58] Field of Search .............. 126/271, 270, 442, 446, 126/448, 452; 237/1 A; 165/171, 173; 52/518, 24, 11

[56] References Cited

U.S. PATENT DOCUMENTS

| | | | |
|---|---|---|---|
| Re. 29,737 | 8/1978 | Bottum | 126/271 |
| 705,350 | 7/1902 | Hubert | 126/434 |
| 1,473,018 | 11/1923 | Danner | 126/447 |
| 3,207,211 | 9/1965 | Winterfeldt | 165/47 |
| 3,893,508 | 7/1975 | Nemet | 165/136 |
| 3,985,117 | 10/1976 | Sallen | 165/171 |
| 4,003,365 | 1/1977 | Wiegand et al. | 126/437 |
| 4,029,080 | 6/1977 | Warren | 126/435 |
| 4,051,832 | 10/1977 | Stelzer | 126/417 |
| 4,055,162 | 10/1977 | Gonzalez | 126/447 |
| 4,056,092 | 11/1977 | Meier et al. | 126/450 |
| 4,064,866 | 12/1977 | Knight | 165/171 |
| 4,076,076 | 2/1978 | Harrison | 165/171 |
| 4,083,360 | 4/1978 | Courvoisier et al. | 126/271 |
| 4,086,913 | 5/1978 | Gavin | 126/271 |
| 4,111,188 | 9/1978 | Murphy | 126/271 |
| 4,114,598 | 9/1978 | Leeuwen | 165/171 |
| 4,117,832 | 10/1978 | Lupkas | 126/271 |
| 4,120,284 | 10/1978 | Cotsworth | 165/171 |
| 4,136,272 | 1/1979 | Rudd | 126/271 |

Primary Examiner—James C. Yeung
Assistant Examiner—Daniel J. O'Connor
Attorney, Agent, or Firm—Charles E. Baxley

[57] ABSTRACT

A method and apparatus for collecting solar energy adapted for use with overlapped roof shingles on the roof or side of a building comprising thin flexible metal plates interposed between the overlapped shingles in heat transfer relation therewith such that heat absorbed by the shingles is transferred to the metal plates. The plates extend through the roof via slots provided therein and are affixed in heat transfer relation with pipes containing a fluid.

7 Claims, 2 Drawing Figures

SOLAR ENERGY COLLECTOR AND ASSOCIATED METHODS ADAPTED FOR USE WITH OVERLAPPED ROOF SHINGLES ON THE ROOF OF A BUILDING

FIELD OF THE INVENTION

The invention relates to a solar engery collector adapted for use with overlapped roof shingles on the roof of a building and to associated methods of collecting solar energy. The invention also relates to a method of installing a solar energy collection system on the roof of a building.

PRIOR ART

The use of solar energy collectors has gained increasing popularity in recent years in view of the great increase in the cost of fuel to heat and cool buildings. Many different varieties of solar collectors are known and, although they are generally expensive, in time their use is intended to compensate for the expense of fuel.

Virtually all systems employ water as the heated fluid as this is readily available and does not involve any extensive engineering sophistication beyond that associated with conventional plumbing systems.

U.S. Pat. No. 4,055,162 to Gonzalez shows a solar collector containing a tubular coil through which a fluid material may be passed.

U.S. Pat. No. 1,473,018 to Danner shows a solar heater comprising a plurality of conduits in intermit contact with the front and rear surfaces of a barrier to absorb heat by direct ray contact and by exchange from the barrier.

U.S. Pat. No. 4,003,365 to Wiegand et al discloses a solar energy collector comprising a solar absorption surface protected by a transparent membrane overlying the absorption surface. The absorption surface is wetted at its underside within the structure by water spray and the water at the underside is heated and recovered.

U.S. Pat. No. 4,056,092 to Meier et al discloses a flat plate collector for heating a fluid comprising a surface which is absorptive to solar radiation positioned below a sheet of material transparent to solar radiation and thereby forming a flat hollow cavity through which a thin sheet of water is passed in contact both with the transparent material and the absorptive surface.

U.S. Pat. No. 4,051,832 to Stelzer discloses a solar heating panel comprising a transparent surface, an opaque surface in spaced relation with the transparent surface to form a space therebetween which is subjected to a vacuum, heat transfer being effected at the back of the opaque surface.

U.S. Pat. No. 4,029,080 to Warren discloses a thermal collector comprising a transparent plate, a backing spaced therefrom and energy absorbing material carried by the backing.

U.S. Pat. No. 705,350 to Hubert discloses a solar heater comprising a heating chamber containing water in a thin film with pipes for leading the water to and from the chamber.

In all of the above systems there is a self-contained unit exposed to the sun and which involves direct contact with water either in the form of a thin stream or in pipes or in a spray at the back of the unit. These systems are all relatively complicated and are rather expensive.

U.S. Pat. No. 3,207,211 to Winterfeldt discloses a trough for the eaves of a roof with a radiation absorbing attachment. Heat transfer is made directly through a tab attached in heat conductive relation to the trough.

U.S. Pat. No. 3,893,508 to Nemet discloses a pressure vessel whose wall comprises a thermal insulating layer and at least one temperature adjustment system.

In all of the above prior art construction none has contemplated the possibility of utilizing the heat which is absorbed by the roof shingles which extend over the entire surface of the roof of a building.

SUMMARY OF THE INVENTION

An object of the invention is to provide a method and system for collecting solar energy by utilizing the heat absorbed by the shingles on a roof of a building.

A further object of the invention is to provide a system and method, as stated above, in which pipes containing a utilization fluid are disposed within the interior of the building.

In accordance with the invention, solar heat is transmitted from the exterior of the building directly to the interior of the building via opaque materials thereby eliminating the problems inherent in exterior solar heating systems presently in use.

In accordance with the invention, there is contemplated a solar energy collector adapted for use with overlapped roof shingles on the roof of a building, said collector comprising thin flexible metal plates interposed between overlapped shingles in heat transfer relation therewith such that heat absorbed by the shingles is transferred to the metal plates, said plates extending through the roof via slots provided therein, and heat receiver means disposed in the interior of the building in heat transfer relation with said plates.

In further accordance with the invention the metal plates have ends which are bent around the heat receiver means.

The heat receiver means can comprise a pipe for conveying water to which heat is transferred from the plates.

In accordance with the invention, the metal plates are made of copper preferably having black heat absorption surfaces.

According to a feature of the invention, the plates are concealed in totality by the shingles.

The inner ends of the metal plates which are bent around the heat receiver pipe are affixed to the pipe by being bent in loop form around the pipe and soldered thereto.

The invention further contemplates a method of collecting solar energy comprising absorbing heat in roof shingles exposed to the sun, transmitting the heat from the roof from the roof shingles to thin metal plates interposed between the shingles in heat transfer relation therewith, said plates extending through the roof into the interior thereof via slits provided in said roof and transferring the heat in the plates to a fluid in a pipe around which an end of the plates is wrapped.

Also contemplated according to the invention is a method of installing a solar energy collecting system on the roof of a building, said method comprising forming slits in a roof structure in spaced relation with one another, mounting pipes in the interior of the roof structure, laying shingles on the outside of the roof structure in overlapped relation with one another, and interposing between the overlapped shingles, before such overlapping, thin metal heat conductive plates with their inner ends extending through the slits into the interior of the roof, the plates being in heat transfer contact with the overlapped shingles, and affixing the inner ends of the plates to the pipes in heat transfer relation.

DETAILED DESCRIPTION

Figure 1:
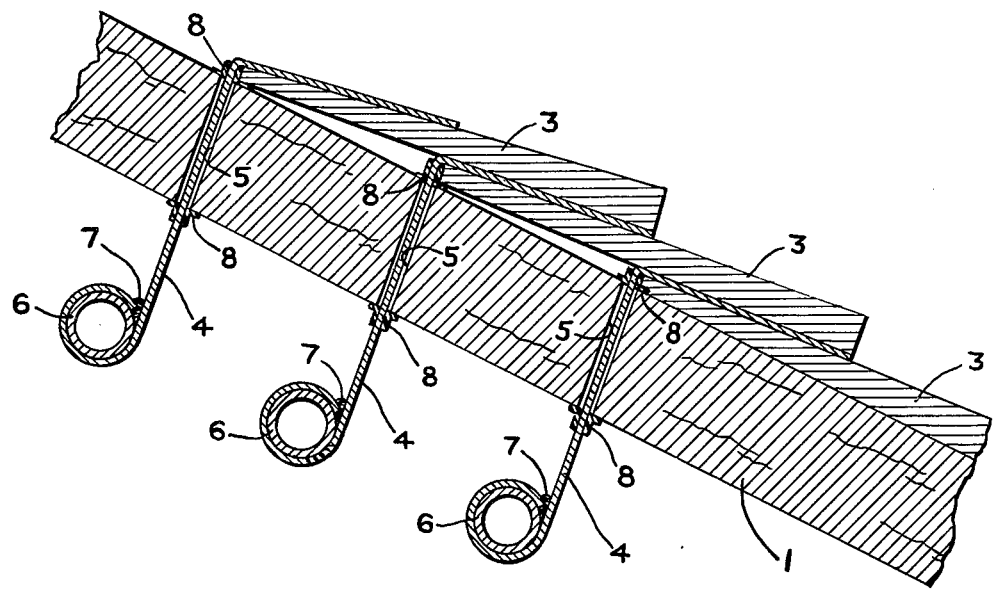
FIG. 1 is a side sectional view of a portion of a roof showing the solar energy collector thereon.

With reference to the drawing therein is shown a portion of a roof structure 1 which supports a solar energy collector 2 in accordance with the invention.

The roof is covered by shingles 3 of conventional type such as slate, asbestos, metal or the like. The shingles are laid in overlapping imbricated arrangement.

The solar energy collector is concealed by the shingles and is installed in such a way as to receive absorbed solar heat therefrom.

More specifically, the solar energy collector comprises thin flexible metal sheets or plates 4 which are interposed between overlapped shingles in heat transfer relation therewith. Thereby, heat absorbed by the shingles is transferred to the interposed metal plates 4.

The metal plates are extended from the location between the overlapped shingles through narrow slots 5 formed in the roof structure to a location within the interior of the roof structure. The sheets 4 are wrapped around pipes 6 adapted for conveying a fluid, such as water. Preferably, the pipes are standard one inch copper piping. The sheets 4 are entirely wrapped around the pipes and are formed into a loop and the leading edge of the loop is fixed to the body of the sheet 4 and to the pipe by means of a solder joint 7. The sheet 4 is tightly wrapped around the pipe 6 so as to be in heat transfer relation therewith.

Tape strips 8 can be secured adjacent the slots both on the inside and the outside of the roof structure 1 in order to maintain insulation between the outside and inside of the roof structure at the slots 5.

In operation, solar heat is absorbed by the shingles and is transferred by conduction and radiation to the metal sheets 4 sandwiched between the shingles. The heat is transmitted through the metal sheets to the pipes 6 causing the fluid therein to be heated. The pipes 6 can lead to a reservoir tank for utilization as domestic hot water or for heating purposes. The reservoir tank can also be constituted as the boiler of a furnace.

Preferably, the metal sheets are made of copper to facilitate the heat absorption from the shingles and the heat transferred to the pipes. The copper sheets can be blackened, at least, in the region where they extend between the shingles.

The installation of the system proceeds as follows:

The pipes 6 are installed within the interior of the roof structure by being suspended from the rafters in conventional fashion.

A number of thin slits or slots 5 are formed in the roof structure along a bias groove corresponding to the positions at which the copper sheets are to extend from the interior to the exterior. The flexible copper sheets are tightly wrapped around the pipes until a loop is formed around the pipe in which the leading edge meets the body of the copper sheets. The copper sheet is then soldered or otherwise securely bonded to the leading edge resulting in complete encompassing of the pipe by the sheet so as to provide complete thermal contact with one another.

The gage of the copper sheets is not of great significance and it is only necessary that it be sufficiently small to allow the sheets to be bent around the pipes to form loops and be easily handled to pass through the slots 5 and be subsequently bended. A thickness of the order of 0.025 to 0.075" will be satisfactory. The copper sheets will be passed through the slots 5, whose size is commensurate with the gage of the copper sheets, and the sheets will project upwardly from the roof structure as shown in dotted lines in FIG. 2.

Figure 2:
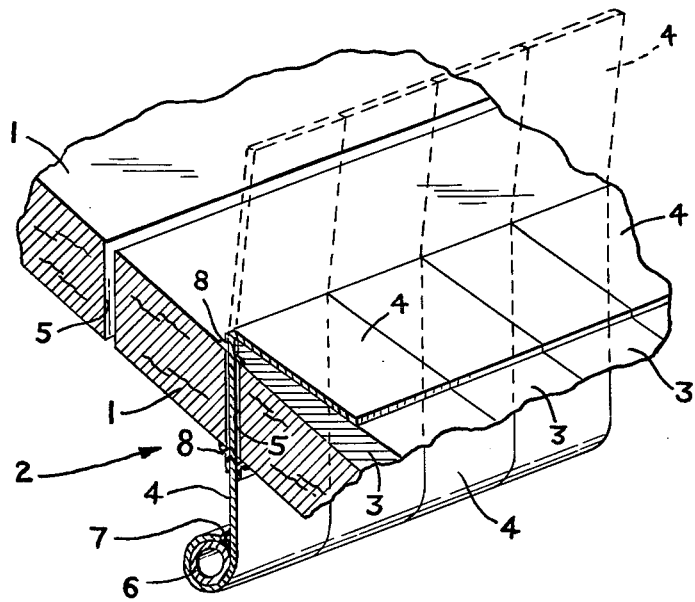
FIG. 2 a top perspective view showing the portion of the roof with the solar energy collector thereon in the course of installation.

The exterior of the roof structure will be covered with an insulating foil upon which a row of shingles is horizontally laid directly below the precut biassed slots 5 as seen in FIG. 2. The shingles can be black or dark gray slate shingles of 20" length, 12" wide and 3/16" thickness.

The copper sheets are approximately 22" in length and as shown in FIG. 2, 12" of the copper sheet will be situated directly above the row of horizontally laid shingles. The copper sheets are then bent down upon the uppermost 12" of shingles lying directly therebelow as shown in solid lines in FIG. 2.

The succeeding row of shingles is then applied and then fastened into place by nailing or the like to cover the exposed 12" of flexible copper sheet. Hence, 12" of the 20" of flexible copper sheet is now sandwiched between the top 12" of the bottom slate and the bottom 12" of the top slate to provide the flexible copper sheet with excellent thermal contact with the shingles above and below. The remaining 8" of the 20" shingle is left exposed to the weather as in the normal installation of shingles. Accordingly, the roof will have the conventional appearance of a shingled roof despite the fact that the solar energy collector has been installed therein.

The dark shingles have a heat absorption rate of about 90% and the solar absorbed heat is transferred by conduction and radiation continuously to the 12" of flexible copper sheet sandwiched between the shingles at the exterior of the building and thence, via the remaining 8" of length of the copper sheet to the pipe 6. The pipes receive the heat from the sheets and serve to heat the fluid contained therein continuously.

Although the flexible sheets have been shown as being independent of the shingles, it is also within the contemplation of the invention that the flexible sheets may be fastened or bonded to the shingles themselves or used independently then passed from the exterior to the interior and then soldered to the pipes 6.

It is to be noted that the flexible sheets are enclosed by the shingles and thereby are not exposed to the weather. Of further significance is the fact that the pipes 6 are disposed within the interior of the roof and hence are contained in the inside of the building.

If desired, one or more transparent covers can be placed over the shingles to prevent heat loss to the outside. The convected air then emanating beneath the transparent covers would be directed to the interior of the building to promote the temperature increase therein.

The durable qualities of both the shingles e.g. slate, and copper provide for substantial life expectancy of the installation. Moreover, since the copper sheet is not exposed to the weather, a single coat of black absorbent paint will be sufficient.

Because the pipes 6 are diposed within the interior of the building, there ordinarily will not be any need for use of anti-freeze solutions within the pipe or for the use of heat exchangers.

The direct exterior to interior solar heating via opaque elements eliminates solar heat losses by transmission as in conventional arrangements.

Furthermore, by using solar radiation and conduction to the pipes 6 and solar convected air into the interior of the building, the solar heat efficiency of the system is maximized.

Furthermore, because the interior water temperature is relative to the exterior shingles, the solar heated liquids could be used both for heating and cooling systems.

Clearly, the system is operative, and solar heating will be automatic, as long as the shingles are exposed to the sun. Constant heat absorption by the fluid contained in the pipes 6 keeps the flexible copper sheets from overheating.

Although the length of the copper sheet within the roof structure and interior of the building has been disclosed to be 8" it is clear that the length of the copper sheet can vary from this figure and can be anywhere from 1 to 9" depending on the particular layout.

It is seen that the invention provides a solar energy collector in which solar heat is brought from the exterior of the building directly to the interior thereof via opaque materials eliminating thereby all of the problems inherent in exterior solar heating systems now in use.

It is deemed that the system is economically feasible and will become publicly acceptable since the system is made an integral part of the interior of the building with easy access thereto. The portion of the system which extends outside the building and which is covered by the shingles will be protected and require no upkeep or maintenance.

Although the invention has been shown in FIG. 2 with individual sheets 4 for respective shingles 3, it is clear that a single sheet 4 can be used to cover a plurality of shingles up to the entire row thereof. Furthermore, it may not be necessary to place the sheets 4 between each row of shingles and in cases of lesser heating and cooling requirements, the sheets can be placed in every other row or at greater spacing.

Although the invention has been described in conjunction with a specific embodiment thereof, numerous modifications and variations can be made by those skilled in the art without departing from the scope and spirit of the invention as defined in the appended claims.

What is claimed is:

1. A solar energy collector adapted for use with overlapped roof shingles on the roof of a building, said collector comprising thin flexible metal plates interposed between the overlapped shingles in heat transfer relation therewith such that heat absorbed by the shingles is transferred to the metal plates, said plates being concealed by the shingles, said plates extending through the roof via slots provided therein, and heat receiver means disposed in the interior of the building in heat transfer relation with said plates, said heat receiver means having a pipe for conveying fluid, said plates having inner ends which are affixed to said pipe in heat exchange relation, said inner plate ends being bent in loop form to encircle said pipe.

2. A solar energy collector as claimed in claim 1 wherein said metal plates are copper.

3. A solar energy collector as claimed in claim 2 wherein said plates have black heat absorption surfaces.

4. A solar energy collector as claimed in claim 1 wherein said shingles are made of slate.

5. A solar energy collector as claimed in claim 1 wherein each said loop of the plates is constituted by a solder joint which also affixes the plate to the pipe.

6. A method of collecting solar energy comprising absorbing heat in roof shingles exposed to the sun, transmitting the heat from the roof shingles to thin metal plates interposed between the shingles in heat transfer relation therewith, said plates extending through the roof into the interior thereof via slits provided in said roof and transferring the heat in the plates to a fluid in a pipe around which one end of the plates is wrapped.

7. A method of installing a solar energy collecting system on the roof of a building, said method comprising forming slits in a roof structure in spaced relation with one another, mounting pipes in the interior of the roof structure, laying shingles on the outside of the roof structure in overlapped relation with one another, and interposing between the overlapped shingles, before such overlapping, thin metal heat conductive plates with their inner ends extending through the slits into the interior of the roof, the plates being in heat transfer contact with the overlapped shingles, and affixing the inner ends of the plates to the pipes in heat transfer relation.

* * * * *